Oct. 7, 1930.  G. F. MYERS  1,777,528

AIRCRAFT SAFETY DEVICE

Original Filed April 12, 1928

Inventor
George Francis Myers
By his Attorney

Patented Oct. 7, 1930

1,777,528

UNITED STATES PATENT OFFICE

GEORGE FRANCIS MYERS, OF JACKSON HEIGHTS, NEW YORK

AIRCRAFT SAFETY DEVICE

Application filed April 12, 1928, Serial No. 269,510. Renewed February 11, 1930.

My invention relates to improvements in aircraft safety devices, and more particularly has reference to, and is illustrated in the accompanying drawings in its application to a parachute or series of parachutes adapted to be confined when not in use within the wing or aerofoil of the machine.

Figure 1:
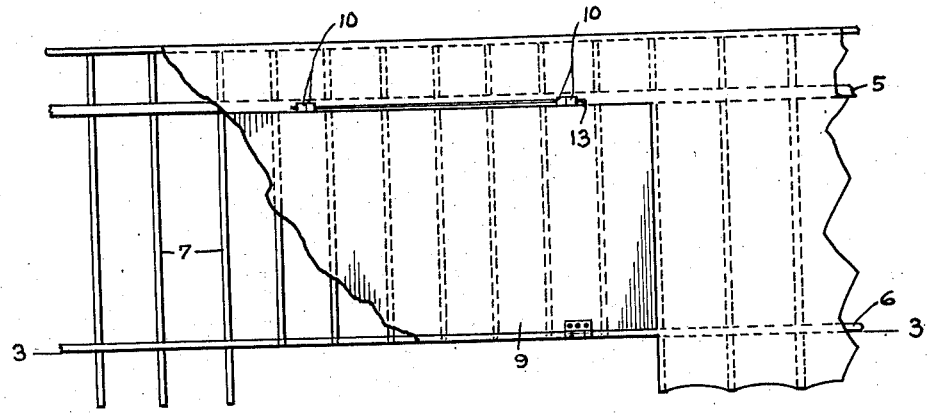
Figure 2:
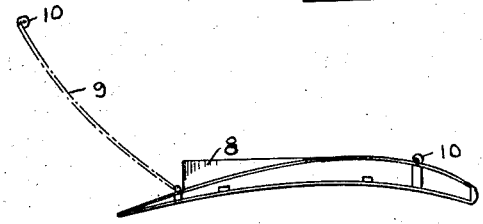
Figure 3:
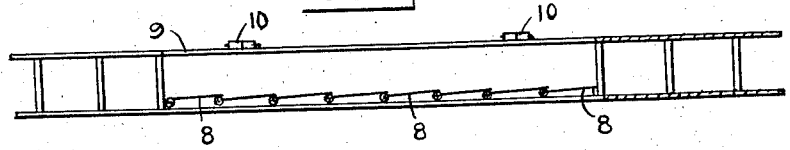
Figure 4:
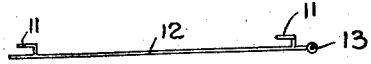

Fig. 1 illustrates in plan view, parts being broken away, a suitable form of aerofoil or plane embodying an application of my invention. Fig. 2 is an end view of the same. Fig. 3 is a longitudinal section on the line 3—3 of Fig. 1, and Fig. 4 is a side view of the locking bar shown in Fig. 1.

5 and 6 indicate the main and rear spars respectively traversed by the ribs 7. Between these spars and adjacent the lower surface of the wing are pivotally mounted a series of flaps 8, upon which the parachute is folded and laid. The top surface of the wing structure comprises a hinged section or cover 9. At the free end of the cover and at points along the main spar are provided cylindrical portions 10, adapted when the cover is closed to be in alignment so as to be engaged by the hooks 11, on the bar 12, provided with a ring 13, so that when the bar is pulled rightwardly looking at Figs. 1 and 4, the cover 9 is released and catches the onrush of air which throws it backwardly in a substantially vertical position, the pressure of air beneath the flaps 8 throwing the same upwardly and shooting the parachute into the air, where it opens, and being secured to the machine almost immediately checks the descent of the same.

Of course it will be understood that various modifications may be made in the construction and arrangement of parts without departing from the spirit of the invention as claimed.

I claim:—

1. In combination with the space between the upper and lower surfaces of an aerofoil, a releasable cover forming when closed a continuation of said upper surface, and means forming the lower surface thereof adapted to be operated by the pressure of air thereon for ejecting anything within said space.

2. In combination with the space between the upper and lower surfaces of an aerofoil, a releasable cover forming when closed a continuation of said upper surface, a parachute within said space, and a series of flaps forming the under surface of said aerofoil adapted when said cover is released to eject said parachute upwardly therefrom.

3. In combination with the space between the upper and lower surfaces of an aerofoil, a releasable cover forming when closed a continuation of said upper surface, a parachute within said space, and a series of flaps forming the under surface of said aerofoil adapted when said cover is released to eject said parachute upwardly therefrom, said cover when released adapted to remain substantially upright.

4. In combination with the space between the upper and lower surfaces of an aerofoil, a releasable cover forming when closed a continuation of said upper surface, and means forming the lower surface thereof adapted to be operated by the pressure of air thereon for ejecting anything within said space, said space extending fore and aft from the main spar to the rear spar of said aerofoil.

5. In combination with the space between the upper and lower surfaces of a hollow body carried by a flying machine, a releasable cover forming when closed a continuation of said upper surface, and means forming the lower surface thereof adapted to be operated by the pressure of air thereon for ejecting anything within said space.

6. In combination with the space between the upper and lower surfaces of an aerofoil said space extending fore and aft from the main spar to the rear spar thereof, a releasable cover forming when closed a continuation of said upper surface, and means forming the lower surface thereof adapted to be operated by the pressure of air thereon for ejecting anything within said space.

7. In combination with the space between the upper and lower surfaces of an aerofoil, a releasable cover forming when closed a continuation of said upper surface both of said surfaces being curved and substantially parallel, and means forming the lower surface thereof adapted to be operated by the pressure of air thereon for ejecting anything within said space.

8. In combination with the space between the upper and lower surfaces of the top aerofoil of a flying machine, a releasable cover forming a continuation of said upper surface, and means forming the lower surface thereof adapted to be operated by the pressure of air thereon for ejecting anything within said space.

9. In combination with a substantially rectangular space between the upper and lower surfaces of an aerofoil, a releasable cover forming when closed a continuation of said upper surface, and means forming the lower surface thereof adapted to be operated by the pressure of air thereon for ejecting anything within said space.

10. In combination with the space between the upper and lower surfaces of an aerofoil having an indented portion, a releasable cover forming when closed a continuation of said upper surface, and means forming the lower surface thereof adapted to be operated by the pressure of air thereon for ejecting anything within said space.

11. In combination with the space between the upper and lower surfaces of an aerofoil, a releasable cover forming when closed a continuation of said upper surface, and means forming the lower surface thereof and comprising a series of substantially parallel and rectangular flaps adapted to be operated by the pressure of air thereon for ejecting anything within said space.

12. In combination with the space between the upper and lower surfaces of an aerofoil, a releasable cover forming when closed a continuation of said upper surface, and means forming the lower surface thereof and comprising a plurality of valves substantially in the same plane adapted to be operated by the pressure of air thereon for ejecting anything within said space.

13. In combination with the space between the upper and lower surfaces of an aerofoil, a releasable cover forming when closed a continuation of said upper surface, a parachute within said space, and a series of parallel flaps substantially in the same plane forming the under surface of said aerofoil adapted when said cover is released to eject said parachute upwardly therefrom.

14. In combination with the space between the upper and lower surface of an aerofoil, a releasable cover forming when closed a continuation of said upper surface, and means forming the lower surface thereof adapted to be operated by the pressure of air thereon for ejecting anything within said space, said cover when released adapted to remain substantially upright in rearward position.

In testimony whereof I hereunto affix my signature.

GEORGE FRANCIS MYERS.